United States Patent
Li et al.

(10) Patent No.: US 11,284,438 B2
(45) Date of Patent: Mar. 22, 2022

(54) RANDOM ACCESS FOR MULTIPLE CARRIER CONFIGURATIONS

(71) Applicant: Telefonaktiebolaget LM Ericsson (publ), Stockholm (SE)

(72) Inventors: Gen Li, Beijing (CN); Jinhua Liu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/320,268

(22) PCT Filed: Aug. 31, 2018

(86) PCT No.: PCT/CN2018/103558
§ 371 (c)(1),
(2) Date: Jan. 24, 2019

(87) PCT Pub. No.: WO2019/047781
PCT Pub. Date: Mar. 14, 2019

(65) Prior Publication Data
US 2020/0084805 A1    Mar. 12, 2020

(30) Foreign Application Priority Data

Sep. 8, 2017  (WO) ................ PCT/CN2017/101040

(51) Int. Cl.
*H04W 74/08* (2009.01)
*H04L 5/00* (2006.01)
(Continued)

(52) U.S. Cl.
CPC ......... *H04W 74/0833* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2011/0053595 A1*  3/2011  Snow .................... H04W 36/08
                                                    455/436
2016/0150571 A1    5/2016  Pelletier et al.
(Continued)

FOREIGN PATENT DOCUMENTS

CN   101340660 A   1/2009
CN   102056297 A   5/2011
(Continued)

OTHER PUBLICATIONS

Huawei, et al., "Overview of NR UL for LTE-NR coexistence", 3GPP TSG RAN WG1 Meeting #89, R1-1709383, Hangzhou, China, May 15-19, 2017, 1-15.

*Primary Examiner* — Hong Shao
(74) *Attorney, Agent, or Firm* — Murphy, Bilak & Homiller, PLLC (57) ABSTRACT

A method for communications is proposed. The method may comprise obtaining configuration information from a network node. The configuration information may indicate random access configurations in two or more carriers comprising a first carrier and a second carrier. The second carrier may have a lower carrier frequency than the first carrier. The method may further comprise determining whether to perform a random access in the second carrier based at least in part on the configuration information.

26 Claims, 6 Drawing Sheets

(51) Int. Cl.
*H04W 72/04* (2009.01)
*H04W 74/00* (2009.01)

(52) U.S. Cl.
CPC ..... *H04W 72/042* (2013.01); *H04W 72/0453* (2013.01); *H04W 74/006* (2013.01)

(56) References Cited

U.S. PATENT DOCUMENTS

| | | | | |
|---|---|---|---|---|
| 2016/0192399 | A1* | 6/2016 | Zhu | H04W 36/0022 370/331 |
| 2018/0376510 | A1* | 12/2018 | Sun | H04W 74/006 |
| 2019/0037579 | A1* | 1/2019 | Yi | H04L 5/001 |
| 2019/0081832 | A1* | 3/2019 | Marinier | H04L 5/0053 |

FOREIGN PATENT DOCUMENTS

| | | | |
|---|---|---|---|
| CN | 102088430 | A | 6/2011 |
| CN | 102196571 | A | 9/2011 |
| WO | 2015113226 | A1 | 8/2015 |

\* cited by examiner

RANDOM ACCESS FOR MULTIPLE CARRIER CONFIGURATIONS

FIELD OF THE INVENTION

The present disclosure generally relates to communication networks, and more specifically, to random access in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, sharing radio resources between different systems in a communication network may facilitate meeting higher service requirements of more users. For example, sharing of a long term evolution (LTE) carrier between a new radio (NR)/fifth generation (5G) system and an LTE/fourth generation (4G) system may accelerate the deployment of the NR system and make the LTE carrier reframing easy in future. In this case, multiple carriers of different systems may be configured as candidate random access carriers for a terminal device. Thus, it may be desirable to improve the random access performance under multiple carrier configurations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

When different systems such as LTE and NR systems coexisting in a communication network employ carrier sharing, there may be multiple uplink (UL) carriers (for example, a UL LTE-NR shared carrier plus a UL NR carrier) associated with a downlink (DL) NR carrier. Thus, at least two carriers (for example, 1.8 GHz LTE-NR shared carrier and 3.5 GHz NR carrier) may be configured as candidate random access carriers for a terminal device. In this case, there may be a need to provide an effective mechanism to control the random access of the terminal device under different configurations in multiple candidate random access carriers.

The present disclosure proposes a random access mechanism for a communication network, which can enable a terminal device to perform a random access under multiple carrier configurations more efficiently, thereby improving the random access success possibility and reducing the random access delay.

According to a first aspect of the present disclosure, there is provided a method implemented at a terminal device. The method may comprise obtaining configuration information from a network node. The configuration information may indicate random access configurations in two or more carriers comprising a first carrier and a second carrier. The second carrier may have a lower carrier frequency than the first carrier. The method may further comprise determining whether to perform a random access in the second carrier based at least in part on the configuration information.

In accordance with an exemplary embodiment, the method according to the first aspect of the present disclosure may further comprise determining to perform a cell reselection, in response to a failure of the random access in the second carrier.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise an obtaining unit and a determining unit. In accordance with some exemplary embodiments, the obtaining unit may be operable to carry out at least the obtaining step of the method according to the first aspect of the present disclosure. The determining unit may be operable to carry out at least the determining step of the method according to the first aspect of the present disclosure.

According to a fifth aspect of the present disclosure, there is provided a method implemented at a network node. The method may comprise determining configuration information for a terminal device. The configuration information may indicate random access configurations in two or more carriers comprising a first carrier and a second carrier. The second carrier may have a lower carrier frequency than the first carrier. The method may further comprise providing the configuration information to the terminal device for determining, by the terminal device, whether to perform a random access in the second carrier.

In accordance with an exemplary embodiment, the method according to the fifth aspect of the present disclosure may further comprise monitoring candidate random access resources in the two or more carriers to detect a random access in at least one of the first carrier and the second carrier.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a determining unit and a providing unit. In accordance with some exemplary embodiments, the determining unit may be operable to carry out at least the determining step of the method according to the fifth aspect of the present disclosure. The providing unit may be operable to carry out at least the providing step of the method according to the fifth aspect of the present disclosure.

In accordance with an exemplary embodiment, the determination as to whether to perform the random access in the second carrier may be made in response to signal quality at the first carrier being higher than a predetermined quality threshold. Optionally, the predetermined quality threshold may be adaptive to a fallback occurrence probability.

In accordance with an exemplary embodiment, the configuration information may indicate the terminal device to select a candidate random access resource which is available earlier among the candidate random access resources to perform the random access.

In accordance with an exemplary embodiment, the determination as to whether to perform the random access in the second carrier based at least in part on the configuration information may comprise: determining to perform the random access in the second carrier, in response that a candidate random access resource in the second carrier is available earlier than a candidate random access resource in the first carrier.

In accordance with an exemplary embodiment, the configuration information may indicate that it is allowable to perform random accesses by the terminal device in both of the first carrier and the second carrier. In this case, the determination as to whether to perform the random access in the second carrier based at least in part on the configuration information may comprise: determining to perform the random access in the second carrier and a random access in the first carrier.

In accordance with an exemplary embodiment, the configuration information may indicate a fallback configuration which enables the terminal device to fall back to the second carrier from the first carrier initially selected as a random access carrier.

In accordance with an exemplary embodiment, the selection of the first carrier as the random access carrier may be made in response that a candidate random access resource in the first carrier is available earlier than a candidate random access resource in the second carrier.

In accordance with an exemplary embodiment, the determination as to whether to perform the random access in the second carrier based at least in part on the configuration information may comprise: determining to perform the random access in the second carrier, in response to one or more predefined events according to the fallback configuration.

In accordance with an exemplary embodiment, the one or more predefined events may comprise at least one of the following events: a number of random access failures of the terminal device in the first carrier reaching a predetermined failure threshold; power ramping of the terminal device in the first carrier achieving the maximum transmitting power of the terminal device; and a speed of the terminal device being larger than a predetermined speed threshold.

In accordance with an exemplary embodiment, the fallback configuration may indicate using a reserved resource for the random access in the second carrier. Alternatively or additionally, the configuration information may comprise a fallback power offset. Optionally, the random access in the second carrier may be performed with a random access power calculated based at least in part on the fallback power offset.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as NR, LTE-Advanced, LTE, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on system capacity and data rates, one interesting option for communication technique development is to allow different systems (such as LTE/4G and NR/5G systems) to coexist in a communication network. These systems may utilize different carrier frequency bands to support traffic communications. For example, the low carrier frequency bands may be deployed in 2G, 3G and 4G systems, while the NR system may use some unused frequency bands such as 3.5 GHz. However, the UL coverage for a 3.5 GHz carrier frequency may be smaller compared to that below 2 GHz. Hence there may be a need to enhance the UL coverage of a UE which is not equipped with good UL beamforming antennas. On the other hand, in order to deploy a standalone NR system at early stage, it may be a benefit to allow LTE and NR systems to share the same carrier.

In accordance with an exemplary embodiment, an LTE carrier may be shared between the LTE and NR systems. In this case, some radio resources of the LTE carrier may be configured as NR resources to ensure the UL coverage, for example, via time division duplexing (TDD) or frequency division duplexing (FDD). Because the LTE carrier is usually of lower carrier frequency, the pathloss of the LTE carrier may be smaller than the NR carrier.

Figure 1A:
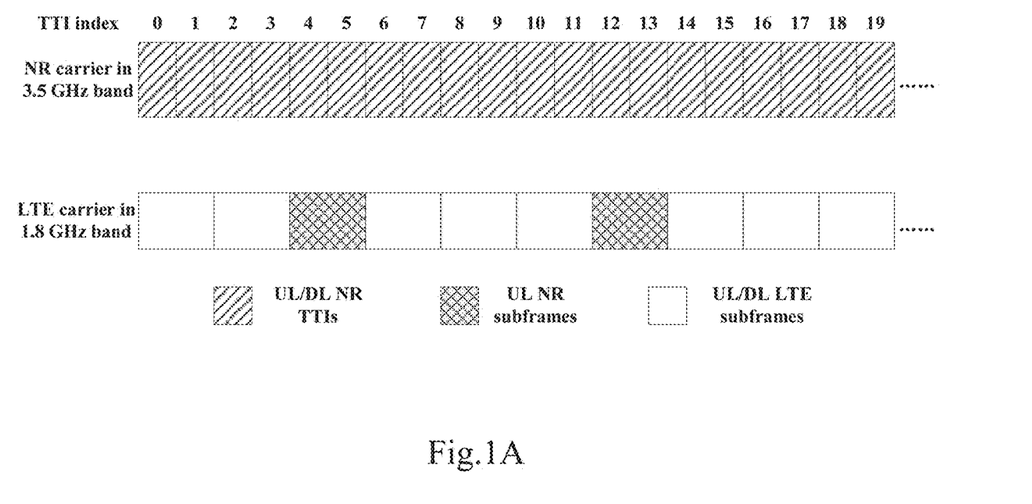
FIGS. 1A-1B are diagrams illustrating examples of carrier sharing according to some embodiments of the present disclosure.
Figure 1B:
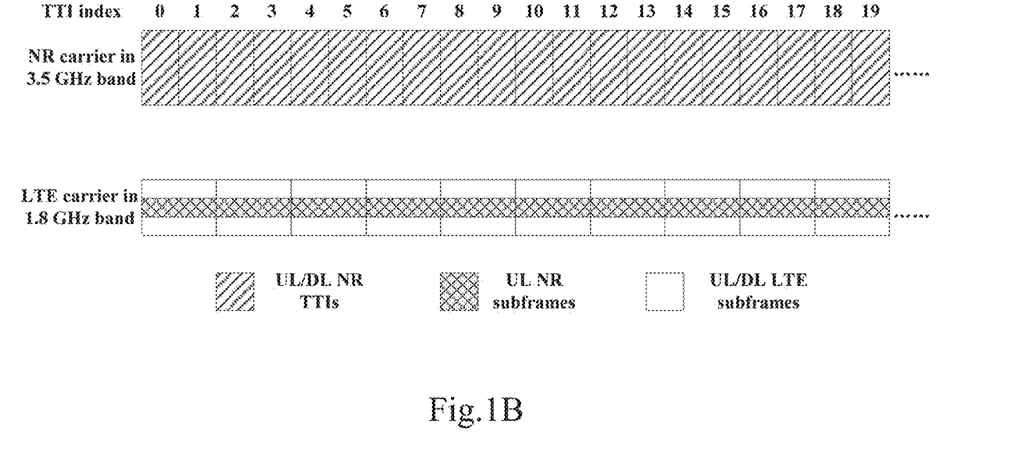

FIGS. 1A-1B are diagrams illustrating examples of carrier sharing according to some embodiments of the present disclosure. Some exemplary transmission time interval (TTI) indexes and radio resources (for example, respectively corresponding to a NR carrier in 3.5 GHz band and an LTE carrier in 1.8 GHz band) are schematically illustrated in FIGS. 1A-1B. The examples shown in FIGS. 1A-1B may be applicable to an LTE-NR coexisting scenario where an LTE carrier is shared between NR and LTE systems in a communication network. It will be appreciated that there may be other scenarios where the communication network may apply or support various radio interface technologies which are not limited to LTE and NR technologies.

As shown in FIGS. 1A-1B, the NR carrier of 3.5 GHz may be scheduled for DL NR transmissions or UL NR transmissions, while the LTE carrier of 1.8 GHz may be scheduled for DL/UL LTE transmissions or for UL NR transmissions. For example, in the case of time divided resource allocation as shown in FIG. 1A, some LTE subframes may be configured as NR radio resources for UL NR transmissions. In the case of frequency divided resource allocation as shown in FIG. 1B, some physical resource blocks (PRBs) of the LTE carrier may be configured as NR radio resources for UL NR transmissions.

For a UE in cell center, the UE may achieve high UL data rate when its UL data transmission is scheduled over a NR carrier due to the large carrier bandwidth of the NR carrier. On the other hand, due to the short TTI and/or short hybrid automatic repeat request (HARQ) round trip time (RTT) of the NR system, the slow start performance of DL/UL transmission control protocol (TCP) service may be expected to be much better when both UL and DL are able to be served in the NR carrier.

When an LTE carrier is shared between the LTE system and the NR system, there may be two UL carriers (for example, a UL LTE-NR shared carrier and a UL NR carrier) associated with a DL NR carrier. In the case that two UL carriers are configured as candidate random access carriers, system information sent in the corresponding DL NR carrier may indicate multiple random access configurations in different UL carriers, for example, 1.8 GHz LTE-NR shared carrier and 3.5 GHz NR carrier.

If random accesses for all NR UEs are only performed in the LTE-NR shared carrier, more collisions may occur under a high traffic load due to limited resources in this carrier for UL NR transmissions. It also may lead to the larger random access delay since only several subframes could be used for the UL NR transmissions. In addition, the communication network may not have enough radio resources to be used for data transmissions for cell edge UEs, because the random accesses may take a high ratio of radio resources in the LTE-NR shared carrier. On the other hand, if random accesses for all NR UEs are only performed in the NR carrier, there may be a coverage problem for those cell edge UEs.

In accordance with an exemplary embodiment, a network node such as a gNB can make configurations for some NR UEs on when to use the LTE-NR shared carrier. For example, configuration information for a shared uplink (SUL) carrier may comprise a certain threshold. A UE may select that SUL carrier for an initial access if reference signal receiving power (RSRP) measured by the UE on the DL carrier where the UE receives remaining system information (RMSI) is lower than the threshold. However, the UE may move fast in the cell and be located at the cell edge in the NR carrier. In this case, the UE may still first try to access in the NR carrier although it may fail to access the carrier.

Therefore, it may be desirable to introduce an effective solution to control the random access with multiple configurations in different carriers. In the proposed solution according to some exemplary embodiments, a terminal device such as a NR UE can selectively perform a random access in at least one carrier (such as an LTE-NR shared carrier and/or a NR carrier), based at least in part on configuration information from a network node such as a gNB. According to an exemplary embodiment, the gNB may configure the NR UE to fall back to the LTE-NR shared carrier from the NR carrier, for example, in response to a predefined event such as random access failures in the NR carrier reaching a certain number of times. Optionally, when falling back to the LTE-NR shared carrier, the random access may be performed with a slightly higher power than the legacy initial power to make sure that the UE could access the carrier as soon as possible. In this way, the service quality of delay sensitive traffics may be enhanced. By applying the proposed solution in the present disclosure, the random access success possibility also may be improved for UEs operating in high carrier frequency bands.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2:
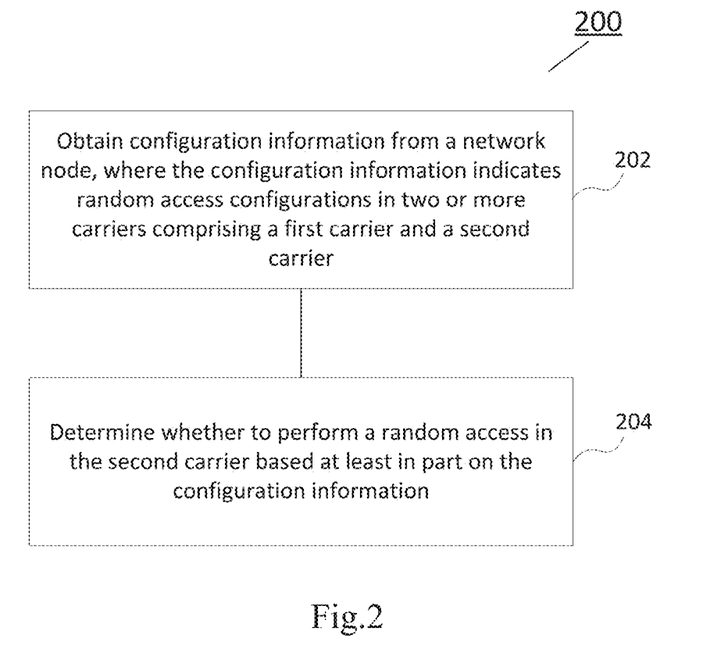
FIG. 2 is a flowchart illustrating a method according to an embodiment of the present disclosure.

FIG. 2 is a flowchart illustrating a method 200 according to an embodiment of the present disclosure. The method 200 illustrated in FIG. 2 may be performed by an apparatus implemented in a terminal device or communicatively coupled to a terminal device. In accordance with an exemplary embodiment, the terminal device such as a UE may be served by a communication network supporting multiple random access configurations. For example, an LTE system and a NR system may coexist in the communication network and share a UL carrier (also called as the LTE-NR shared carrier). In this case, the UE may be configured with at least two UL carriers comprising a NR carrier and an LTE-NR shared carrier.

According to the exemplary method 200 illustrated in FIG. 2, the terminal device can obtain configuration information from a network node such as a gNB, as shown in block 202. For example, the configuration information may indicate random access configurations in two or more carriers. In an exemplary embodiment, the two or more carriers may comprise a first carrier and a second carrier which may have a lower carrier frequency than the first carrier. For example, the first carrier may comprise a NR carrier (for example, 3.5 GHz carrier), and the second carrier may comprise an LTE carrier (for example, 1.8 GHz carrier) which may be shared between LTE and NR systems.

Based at least in part on the configuration information, the terminal device may determine whether to perform a random access in the second carrier, as shown in block 204. In accordance with an exemplary embodiment, the determination as to whether to perform the random access in the second carrier may be made in response to signal quality (such as reference signal receiving quality (RSRQ) or RSRP) at the first carrier being higher than a predetermined quality threshold. Optionally, the predetermined quality threshold may be specified in the configuration information from the network node.

In accordance with an exemplary embodiment, the configuration information may indicate that it is allowable to perform random accesses by the terminal device in both of the first carrier and the second carrier. In this case, the determination as to whether to perform the random access in the second carrier based at least in part on the configuration information may comprise: determining to perform the random access in the second carrier and a random access in the first carrier.

Alternatively, the terminal device may select any of the first carrier and the second carrier to perform the random access based at least in part on the configuration information. For example, the terminal device may determine to perform the random access in the second carrier, in response that a candidate random access resource in the second carrier is available earlier than a candidate random access resource in the first carrier. It will be appreciated that the terminal device also may select the first carrier instead of the second carrier as a random access carrier, in response that the candidate random access resource in the first carrier is available earlier than the candidate random access resource in the second carrier.

In accordance with an exemplary embodiment, the configuration information may indicate a fallback configuration which may enable the terminal device to fall back to the second carrier from the first carrier initially selected as a random access carrier. For example, a UE may select to perform a random access in a NR carrier when its measured RSRP at the NR carrier is higher than a predetermined threshold. However, the random access in the NR carrier may fail because the measurement may be outdated (for example, in high speed case) or the load in the NR carrier is high. In order to reduce the random access failure rate, the network node such as a gNB may configure the UE to fall back to a robust carrier such as an LTE-NR shared carrier from the NR carrier according to the fallback configuration.

In accordance with an exemplary embodiment, the terminal device may determine to perform the random access in the second carrier, in response to one or more predefined events according to the fallback configuration. For example, the one or more predefined events may comprise at least one of the following events: a number of random access failures of the terminal device in the first carrier reaching a predetermined failure threshold; power ramping of the terminal device in the first carrier achieving the maximum transmitting (TX) power of the terminal device; and a speed of the terminal device being larger than a predetermined speed threshold. It will be realized that there might be other events or conditions which may trigger the terminal device falling back to the random access in the second carrier.

In accordance with an exemplary embodiment, the fallback configuration may indicate using a reserved resource for the random access in the second carrier. For example, some random access resources such as sequences in the second carrier (also referred to as a fallback carrier for ease of description) may be reserved for UEs (also referred to as fallback UEs for ease of description) which perform random accesses in the fallback carrier. In this way, the fallback UEs of which the random accesses are already delayed may use the reserved random access resources in the fallback carrier immediately with lower collision probability.

In accordance with an exemplary embodiment, the configuration information may comprise a fallback power offset. In this case, the random access in the second carrier may be performed with a random access power calculated based at least in part on the fallback power offset. For example, the gNB may configure the fallback power offset for the UE. When falling back to an LTE-NR shared carrier from a NR carrier, the UE may make the physical random access channel (PRACH) power start with the legacy initial power plus the fallback power offset.

For example, the legacy initial random access channel (RACH) preamble power (corresponding to the first PRACH that the UE transmits) may be calculated by equation (1).

$$\text{Initial RACH Preamble Power} = \text{Primary SSB TX Power} + \text{SSB\_RSRP} + \text{PREAMBLE\_RECEIVED\_TARGET\_POWER} \quad (1)$$

where "Primary SSB TX Power" is the primary TX power for a synchronization signal block (SSB), "SSB_RSRP" is the SSB RSRP measured at the UE, and "PREAMBLE_RECEIVED_TARGET_POWER" is the target received power of a PRACH preamble. Parameter values of "Primary SSB TX Power" and "PREAMBLE_RECEIVED_TARGET_POWER" may be calculated or obtained from system information, and a value of "SSB_RSRP" may be directly measured by the UE. For example, the value of "PREAMBLE_RECEIVED_TARGET_POWER" may be calculated based at least in part on the initial target received power of the PRACH preamble and power ramping.

In case that the UE falls back to the LTE-NR shared carrier, the fallback power offset may be configured in the system information and then the fallback RACH preamble power may be calculated by equation (2).

$$\text{Fallback RACH Preamble Power} = \text{Primary SSB TX Power} + \text{SSB\_RSRP} + \text{PREAMBLE\_RECEIVED\_TARGET\_POWER} + \text{fallback power offset} \quad (2)$$

As such, the PRACH power of the fallback UE may start with a little higher than the legacy initial power, so as to make sure that the UE could access the fallback carrier as soon as possible.

In accordance with an exemplary embodiment, the predetermined quality threshold (such as a RSRP or RSRQ threshold configured by the network node) for determining which carrier may be selected as a random access carrier may be adaptive to a fallback occurrence probability. For example, the gNB may adaptively adjust the configured RSRP threshold based at least in part on the fallback rate. When the gNB determines that the number of fallback UEs exceeds a predefined threshold associated with the fallback rate, it may reconfigure the RSRP threshold to be higher to reduce the fallback occurrence probability.

In accordance with an exemplary embodiment, the terminal device may determine to perform a cell reselection, in response to a failure of the random access in the second carrier. For example, the UE may consider a random access failure in the camped cell when a random access in the fallback carrier also fails, which may trigger the UE performing a cell reselection.

Figure 3:
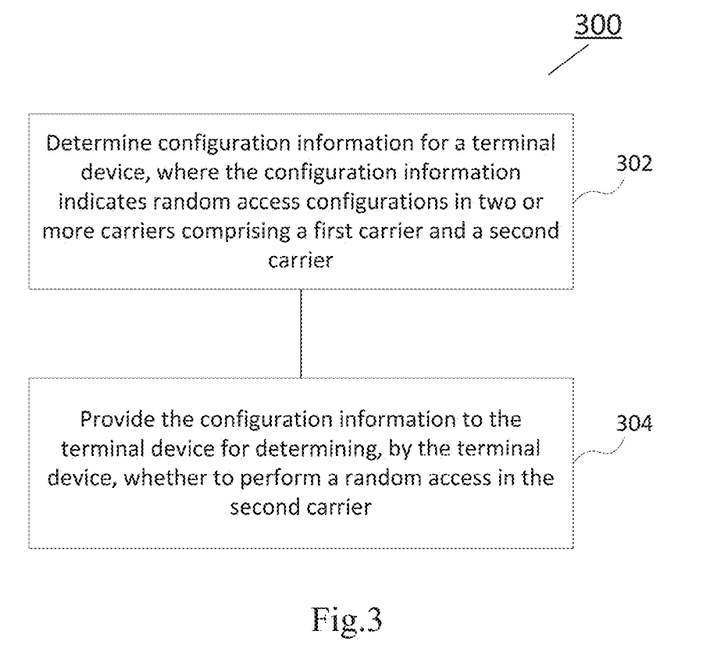
FIG. 3 is a flowchart illustrating a method according to another embodiment of the present disclosure.

FIG. 3 is a flowchart illustrating a method 300 according to another embodiment of the present disclosure. The method 300 illustrated in FIG. 3 may be performed by an apparatus implemented in a network node or communicatively coupled to a network node. In accordance with an exemplary embodiment, the network node such as a gNB may configure the 3.5 GHz carrier as a standalone NR carrier and part of the 1.8 GHz carrier as an LTE-NR shared carrier.

Corresponding to operations of the exemplary method 200 as illustrated in FIG. 2, the network node in the exemplary method 300 may determine configuration information for a terminal device, as shown in block 302. As described in connection with FIG. 2, the configuration information may indicate random access configurations in two or more carriers comprising a first carrier (such as the 3.5 GHz carrier) and a second carrier (such as the 1.8 GHz carrier) which has a lower carrier frequency than the first carrier.

According to the exemplary method 300, the network node may provide the configuration information to the terminal device for determining, by the terminal device, whether to perform a random access in the second carrier, as shown in block 304. For example, the determination as to whether to perform the random access in the second carrier may be made in response that signal quality at the first carrier is higher than a predetermined quality threshold indicated in the configuration information. Optionally, the predetermined quality threshold may be adjusted adaptively by the network node according to a fallback occurrence probability.

In accordance with an exemplary embodiment, the network node may monitor candidate random access resources in the two or more carriers to detect a random access in at least one of the first carrier and the second carrier. Optionally, the configuration information may indicate that it is allowable to perform random accesses in both of the first carrier and the second carrier. As such, the terminal device can select at least one of the first carrier and the second carrier as a random access carrier. In an exemplary embodiment, the configuration information may indicate the terminal device to select a candidate random access resource which is available earlier among the candidate random access resources to perform the random access. Accordingly, the terminal device may perform the random access in the carrier having the selected candidate random access resource.

In accordance with an exemplary embodiment, the configuration information may indicate a fallback configuration for enabling the terminal device to fall back to the second carrier from the first carrier initially selected as the random access carrier. As illustrated with respect to FIG. 2, the random access may be performed in the second carrier in response to one or more predefined events according to the fallback configuration.

In accordance with an exemplary embodiment, according to the fallback configuration, the network node may reserve certain radio resources for the random access in the second carrier. Optionally, the network node may indicate a fallback power offset in the configuration information for the terminal device, so that the terminal device can calculate a random access power based at least in part on the fallback power offset.

It will be realized that parameters, variables, events and settings related to the fallback configuration described herein are just examples. Other suitable parameter settings, the associated configuration parameters and the specific values thereof may also be applicable to implement the proposed methods.

Figure 4:
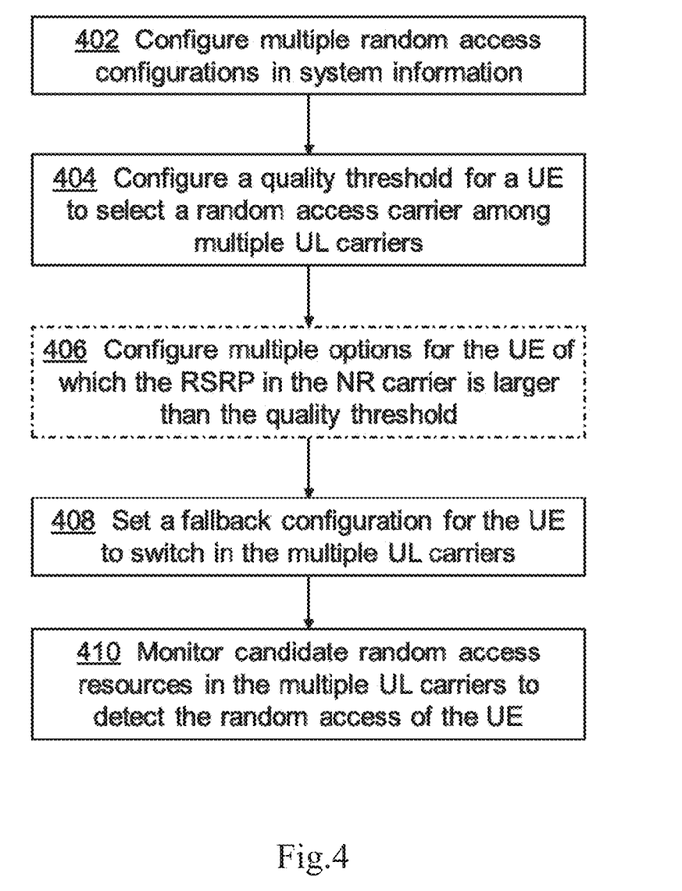
FIG. 4 is a diagram illustrating an exemplary network side procedure according to an embodiment of the present disclosure.

FIG. 4 is a diagram illustrating an exemplary network side procedure according to an embodiment of the present disclosure. The exemplary procedure illustrated in FIG. 4 may be performed by a network node such as a gNB. According to the procedure shown in FIG. 4, the gNB may configure 402 multiple random access configurations in system information. In an exemplary embodiment, the gNB may send the system information (for example, in a SSB for NR) in the 3.5 GHz carrier to a UE, and the system information may indicate random access configurations in both 1.8 GHz and 3.5 GHz UL carriers. The gNB also may configure 404 a quality threshold for the UE to select a random access carrier among multiple UL (or TDD) carriers (for example, the NR carrier and the LTE-NR shared carrier). In an exemplary embodiment, the UE may select the NR carrier as the random access carrier if the RSRP at the NR carrier is higher than the configured quality threshold. Alternatively or additionally, the UE may use the LTE-NR shared carrier as the random access carrier.

Optionally, the gNB may configure 406 multiple options for the UE of which the RSRP in the NR carrier is larger than the quality threshold. For example, Option I may indicate that it is allowable to transmit PRACH in both NR carrier and LTE-NR shared carrier. Alternatively, Option II may indicate that the UE may transmit PRACH in a random access carrier selected from the NR carrier and the LTE-NR shared carrier according to a specified criterion. For example, a carrier in which a candidate random access resource is available earlier may be selected as the random access carrier. Alternatively or additionally, Option III may indicate that the UE may fall back to a relative robust carrier (such as the LTE-NR shared carrier) from the initially selected random access carrier (such as the NR carrier).

As shown in FIG. 4, the gNB may set 408 a fallback configuration for the UE to switch in the multiple UL carriers. The fallback configuration may specify one or more events or conditions to trigger the fallback random access of the UE. It will be appreciated that the multiple random access configurations, the quality threshold, the multiple options for random access and/or the fallback configuration as mentioned previously may be provided as the system information in one or more messages to the UE. Then, the gNB may monitor 410 candidate random access resources in the multiple UL carriers to detect the random access of the UE, for example, via PRACH. Optionally, the gNB may define a fallback rate threshold to control the number of fallback UEs. For example, if the number of fallback UEs exceeds the fallback rate threshold, the gNB may reconfigure the quality threshold for random access carrier selection to adjust the fallback occurrence probability.

Figure 5:
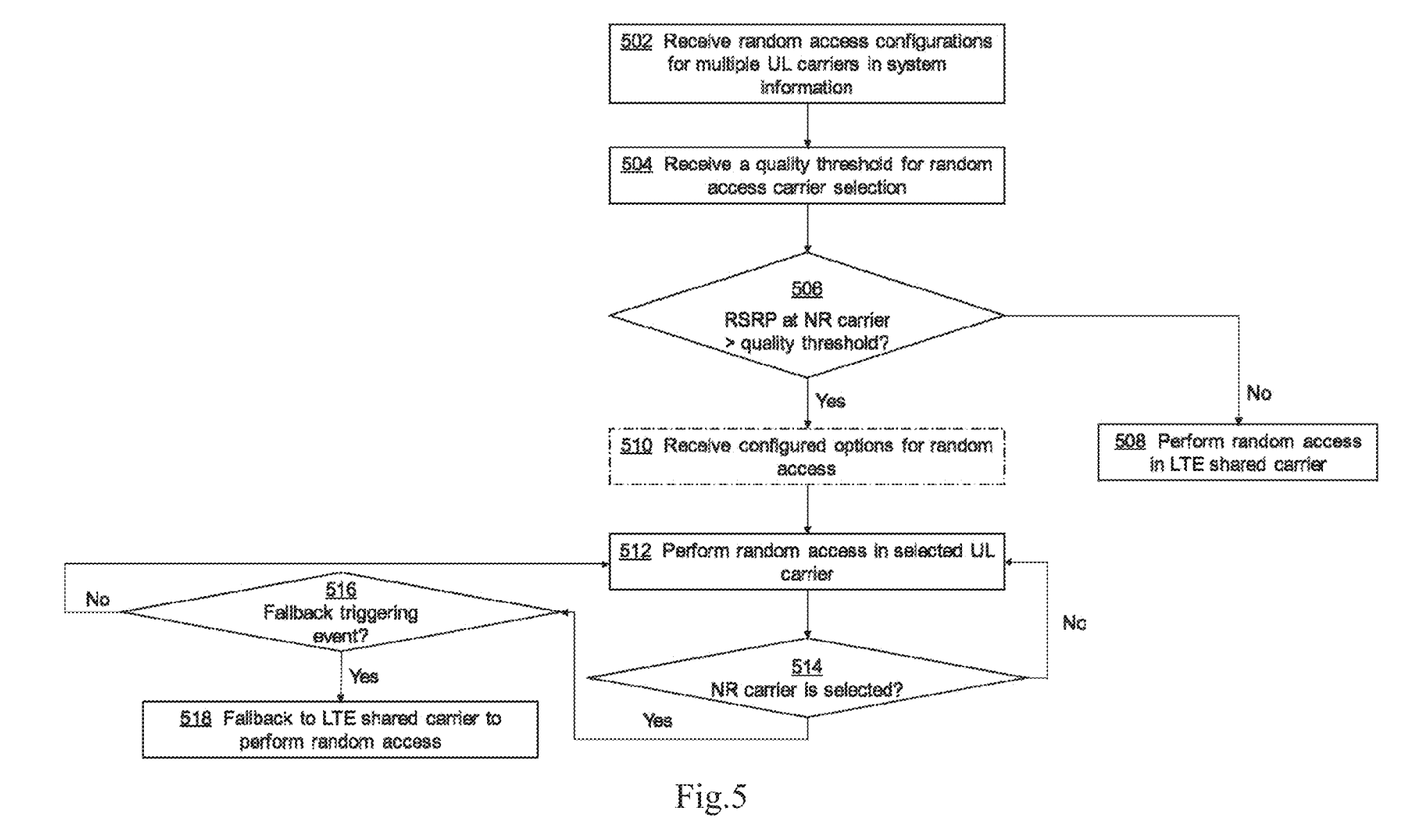
FIG. 5 is a diagram illustrating an exemplary UE side procedure according to another embodiment of the present disclosure.

FIG. 5 is a diagram illustrating an exemplary UE side procedure according to another embodiment of the present disclosure. The exemplary procedure illustrated in FIG. 5 may be performed at a terminal device such as a UE. According to the procedure shown in FIG. 5, the UE may receive 502 random access configurations for multiple UL carriers in system information from a gNB. Corresponding to the operations of the gNB as described in connection with FIG. 4, the UE may receive 504 a quality threshold for random access carrier selection. If it is determined at block 506 that the RSRP at the NR carrier is smaller than or equal to the quality threshold, the UE may perform 508 the random access in the LTE-NR shared carrier. It may be appreciated that the random access carrier selection shown in block 508 is just as an example, and the UE also may select other suitable carrier as the random access carrier.

Optionally, the UE may receive 510 some configured options for random access from the gNB, such as Options I, II and III as illustrated with respect to FIG. 4. If it is determined at block 506 that the RSRP at the NR carrier is larger than the quality threshold, the UE may select a proper UL carrier as the random access carrier, for example, according to a random access option configured by the gNB. Then, the UE may perform 512 the random access in the selected UL carrier. In case that the NR carrier is selected (corresponding to the "Yes" branch of the block 514), it may be determined at block 516 whether one or more fallback triggering events occur.

For example, the fallback triggering events may comprise: random access failures in the NR carrier reaching a certain number of times such as 5, power ramping in the NR carrier achieving the maximum TX power of the UE, a speed of the UE being larger than a predefined threshold, and/or the like. In response to the one or more fallback triggering events, the UE may fall back 518 to the LTE-NR shared carrier to perform a fallback random access. Optionally, the power used for the fallback random access may be set based at least in part on a fallback power offset configured by the gNB. Alternatively or additionally, the UE may use some reserved random access resources to perform the fallback random access, thereby decreasing the collision probability and reducing the random access delay.

The proposed solution according to one or more exemplary embodiments can enable a UE to perform a random access more efficiently. For example, taking the advantage of the proposed fallback configuration makes the UE be able to switch among multiple UL carriers during a random access procedure, which may improve the random access success possibility for those UEs operating in high frequency bands. Besides, when falling back to the shared UL carrier, the UE may use some reserved resources and/or make the PRACH power starting with a slightly higher power than the legacy initial power, which may enable the UE to access the random access carrier as soon as possible.

The various blocks shown in FIGS. 2-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
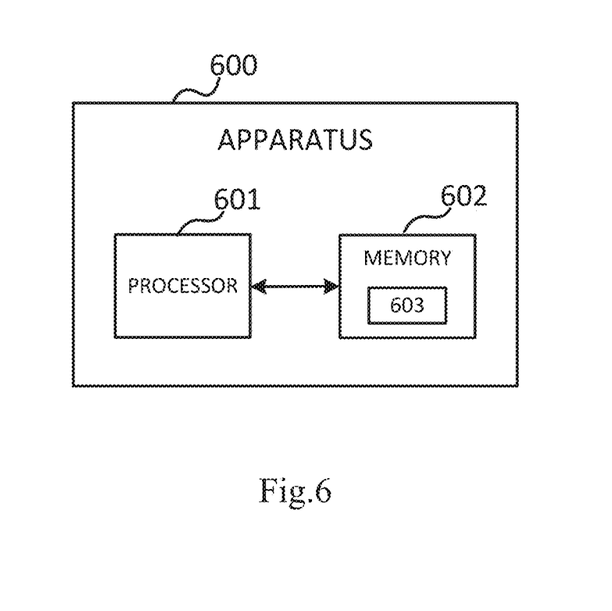
FIG. 6 is a block diagram illustrating an apparatus according to an embodiment of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In some implementations, the one or more memories 602 and the computer program codes 603 may be configured to, with the one or more processors 601, cause the apparatus 600 at least to perform any operation of the method as described in connection with FIG. 2. In other implementations, the one or more memories 602 and the computer program codes 603 may be configured to, with the one or more processors 601, cause the apparatus 600 at least to perform any operation of the method as described in connection with FIG. 3.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
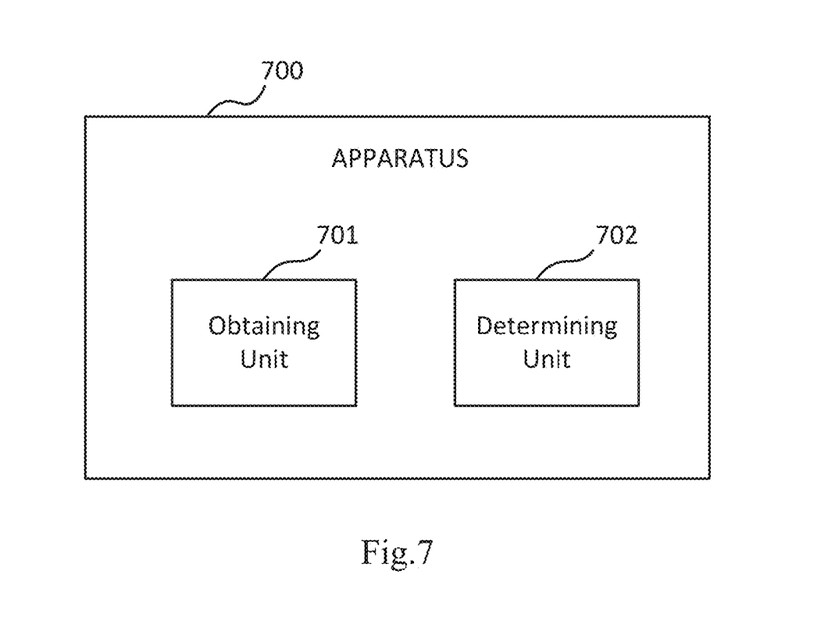
FIG. 7 is a block diagram illustrating another apparatus according to another embodiment of the present disclosure.

FIG. 7 is a block diagram illustrating an apparatus 700 according to another embodiment of the present disclosure. As shown in FIG. 7, the apparatus 700 may comprise an obtaining unit 701 and a determining unit 702. In an exemplary embodiment, the apparatus 700 may be implemented at a terminal device such as a UE. The obtaining unit 701 may be operable to carry out the operation in block 202, and the determining unit 702 may be operable to carry out the operation in block 204. Optionally, the obtaining unit 701 and/or the determining unit 702 may be operable to carry out more or less operations to implement the proposed methods according to the exemplary embodiments of the present disclosure.

Figure 8:
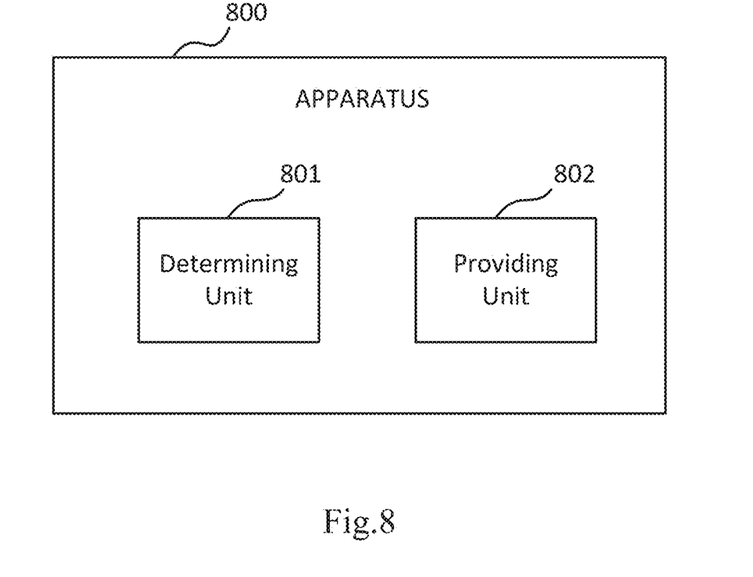
FIG. 8 is a block diagram illustrating yet another apparatus according to a further embodiment of the present disclosure.

FIG. 8 is a block diagram illustrating an apparatus 800 according to a further embodiment of the present disclosure. As shown in FIG. 8, the apparatus 800 may comprise a determining unit 801 and a providing unit 802. In an exemplary embodiment, the apparatus 800 may be implemented at a network node such as a gNB. The determining unit 801 may be operable to carry out the operation in block 302, and the providing unit 802 may be operable to carry out the operation in block 304. Optionally, the determining unit 801 and/or the providing unit 802 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a New Radio (NR) user equipment (UE) configured for use in an NR system, the method comprising:

receiving, over a downlink NR carrier, configuration information that indicates a first random access configuration in an uplink NR carrier and indicates a second random access configuration in an uplink Long Term Evolution (LTE)-NR shared carrier, wherein radio resources usable for uplink transmission in the uplink LTE-NR shared carrier are divided in time or frequency between radio resources usable for uplink NR transmission in the uplink LTE-NR shared carrier and radio resources usable for uplink LTE transmission in the uplink LTE-NR shared carrier, wherein the uplink LTE-NR shared carrier has a lower carrier frequency than the uplink NR carrier, wherein the configuration information configures the NR UE when to perform random access to the NR system in the uplink NR carrier according to the first random access configuration and when to perform random access to the NR system in the radio resources usable for uplink NR transmission in the uplink LTE-NR shared carrier according to the second random access configuration, and wherein the configuration information indicates the NR UE is to perform random access in the uplink LTE-NR shared carrier using a random access resource reserved for NR UEs performing random access in the uplink LTE-NR shared carrier as a fallback carrier after failure of random access to the NR system in the uplink NR carrier; and based on the configuration information, performing random access to the NR system in the uplink NR carrier according to the first random access configuration or in the radio resources usable for uplink NR transmission in the uplink LTE-NR shared carrier according to the second random access configuration.

2. The method of claim 1, wherein subframes usable for uplink transmission in the uplink LTE-NR shared carrier are divided between subframes usable for uplink NR transmission in the uplink LTE-NR shared carrier and subframes usable for uplink LTE transmission in the uplink LTE-NR shared carrier.

3. The method of claim 1, wherein physical resource blocks (PRBs) usable for uplink transmission in the uplink LTE-NR shared carrier are divided in frequency between PRBs usable for uplink NR transmission in the uplink LTE-NR shared carrier and PRBs usable for uplink LTE transmission in the uplink LTE-NR shared carrier.

4. The method of claim 1, wherein the configuration information indicates a signal quality threshold, wherein the NR UE is to perform random access to the NR system in the uplink NR carrier according to the first random access configuration when a signal quality on the downlink NR carrier is greater than or equal to the signal quality threshold and is to perform random access in the radio resources usable for uplink NR transmission in the uplink LTE-NR shared carrier according to the second random access configuration when a signal quality on the downlink NR carrier is less than the signal quality threshold.

5. The method of claim 1, wherein the configuration information indicates the NR UE is to perform random access in the radio resources usable for uplink NR transmission in the uplink LTE-NR shared carrier according to the second random access configuration when random access to the NR system in the uplink NR carrier according to the first random access configuration has failed a certain number of times.

6. The method of claim 1, wherein the configuration information indicates the NR UE is to perform random access in the radio resources usable for uplink NR transmission in the uplink LTE-NR shared carrier according to the second random access configuration when the NR UE has ramped its transmit power for performing random access to the NR system in the uplink NR carrier according to the first random access configuration up to a maximum transmit power of the NR UE.

7. The method of claim 1, wherein the configuration information indicates the NR UE is to perform random access in the radio resources usable for uplink NR transmission in the uplink LTE-NR shared carrier according to the second random access configuration when a speed of the NR UE is larger than a speed threshold.

8. The method of claim 1, wherein the reserved random access resource is a random access sequence.

9. The method of claim 1, wherein the configuration information indicates the NR UE is to:
perform random access to the NR system in the uplink NR carrier according to the first random access configuration when a candidate random access resource in the uplink NR carrier is available earlier than a candidate random access resource in the uplink LTE-NR shared carrier; and
perform random access to the NR system in the radio resources usable for uplink NR transmission in the uplink LTE-NR shared carrier according to the second random access configuration when a candidate random access resource in the uplink shared LTE-NR carrier is available earlier than a candidate random access resource in the uplink NR carrier.

10. The method of claim 1, wherein the configuration information indicates a fallback power offset, wherein the fallback power offset is an amount by which the NR UE is to offset random access power if the NR UE falls back to the uplink LTE-NR shared carrier for random access, and wherein the method further comprises performing random access to the NR system in the radio resources usable for uplink NR transmission in the uplink LTE-NR shared carrier according to the second random access configuration with a random access power calculated based at least in part on the fallback power offset.

11. A New Radio (NR) user equipment (UE) configured for use in an NR system, the NR UE comprising:
one or more processors; and
one or more memories comprising computer program code, the one or more memories and the computer program code configured to, with the one or more processors, cause the NR UE to:
receive, over a downlink NR carrier, configuration information that indicates a first random access configuration in an uplink NR carrier and indicates a second random access configuration in an uplink Long Term Evolution (LTE)-NR shared carrier, wherein radio resources usable for uplink transmission in the uplink LTE-NR shared carrier are divided in time or frequency between radio resources usable for uplink NR transmission in the uplink LTE-NR shared carrier and radio resources usable for uplink LTE transmission in the uplink LTE-NR shared carrier, wherein the uplink LTE-NR shared carrier has a lower carrier frequency than the uplink NR carrier, wherein the configuration information configures the NR UE when to perform random access to the NR system in the uplink NR carrier according to the first random access configuration and when to perform random access to the NR system in the radio resources usable for uplink NR transmission in the uplink LTE-NR shared carrier according to the second random access configuration, and wherein the configuration information indicates the NR UE is to perform random access in the uplink LTE-NR shared carrier using a random access resource reserved for NR UEs performing random access in the uplink LTE-NR shared carrier as a fallback carrier after failure of random access to the NR system in the uplink NR carrier; and
based on the configuration information, perform random access to the NR system in the uplink NR carrier according to the first random access configuration or in the radio resources usable for uplink NR transmission in the uplink LTE-NR shared carrier according to the second random access configuration.

12. The NR UE of claim 11, wherein subframes usable for uplink transmission in the uplink LTE-NR shared carrier are divided between subframes usable for uplink NR transmission in the uplink LTE-NR shared carrier and subframes usable for uplink LTE transmission in the uplink LTE-NR shared carrier.

13. The NR UE of claim 11, wherein physical resource blocks (PRBs) usable for uplink transmission in the uplink LTE-NR shared carrier are divided in frequency between PRBs usable for uplink NR transmission in the uplink LTE-NR shared carrier and PRBs usable for uplink LTE transmission in the uplink LTE-NR shared carrier.

14. The NR UE of claim 11, wherein the configuration information indicates a signal quality threshold, wherein the NR UE is to perform random access to the NR system in the uplink NR carrier according to the first random access configuration when a signal quality on the downlink NR carrier is greater than or equal to the signal quality threshold and is to perform random access in the radio resources usable for uplink NR transmission in the uplink LTE-NR shared carrier according to the second random access configuration when a signal quality on the downlink NR carrier is less than the signal quality threshold.

15. The NR UE of claim 11, wherein the configuration information indicates the NR UE is to perform random access in the radio resources usable for uplink NR transmission in the uplink LTE-NR shared carrier according to the second random access configuration when random access to the NR system in the uplink NR carrier according to the first random access configuration has failed a certain number of times.

16. The NR UE of claim 11, wherein the configuration information indicates the NR UE is to perform random access in the radio resources usable for uplink NR transmission in the uplink LTE-NR shared carrier according to the second random access configuration when the NR UE has ramped its transmit power for performing random access to the NR system in the uplink NR carrier according to the first random access configuration up to a maximum transmit power of the NR UE.

17. The NR UE of claim 11, wherein the configuration information indicates the NR UE is to perform random access in the radio resources usable for uplink NR transmission in the uplink LTE-NR shared carrier according to the second random access configuration when a speed of the NR UE is larger than a speed threshold.

18. The NR UE of claim 11, wherein the reserved random access resource is a random access sequence.

19. The NR UE of claim 11, wherein the configuration information indicates the NR UE is to:
perform random access to the NR system in the uplink NR carrier according to the first random access configuration when a candidate random access resource in the uplink NR carrier is available earlier than a candidate random access resource in the uplink LTE-NR shared carrier; and
perform random access to the NR system in the radio resources usable for uplink NR transmission in the uplink LTE-NR shared carrier according to the second random access configuration when a candidate random access resource in the uplink shared LTE-NR carrier is available earlier than a candidate random access resource in the uplink NR carrier.

20. The NR UE of claim 11, wherein the configuration information indicates a fallback power offset, wherein the fallback power offset is an amount by which the NR UE is to offset random access power if the NR UE falls back to the uplink LTE-NR shared carrier for random access, and wherein the one or more memories and the computer program code are configured to, with the one or more processors, cause the NR UE to perform random access to the NR system in the radio resources usable for uplink NR transmission in the uplink LTE-NR shared carrier according to the second random access configuration with a random access power calculated based at least in part on the fallback power offset.

21. A method at a network node, the method comprising:
determining configuration information that indicates a first random access configuration in an uplink New Radio (NR) carrier and indicates a second random access configuration in an uplink Long Term Evolution (LTE)-NR shared carrier, wherein radio resources usable for uplink transmission in the uplink LTE-NR shared carrier are divided in time or frequency between radio resources usable for uplink NR transmission in the uplink LTE-NR shared carrier and radio resources usable for uplink LTE transmission in the uplink LTE-NR shared carrier, wherein the uplink LTE-NR shared carrier has a lower carrier frequency than the uplink NR carrier, wherein the configuration information configures an NR use equipment (UE) when to perform random access to the NR system in the uplink NR carrier according to the first random access configuration and when to perform random access to the NR system in the radio resources usable for uplink NR transmission in the uplink LTE-NR shared carrier according to the second random access configuration, and wherein the configuration information indicates the NR UE is to perform random access in the uplink LTE-NR shared carrier using a random access resource reserved for NR UEs performing random access in the uplink LTE-NR shared carrier as a fallback carrier after failure of random access to the NR system in the uplink NR carrier; and
transmitting the configuration information to the NR UE over a downlink NR carrier.

22. The method of claim 21, wherein either:
subframes usable for uplink transmission in the uplink LTE-NR shared carrier are divided between subframes usable for uplink NR transmission in the uplink LTE-NR shared carrier and subframes usable for uplink LTE transmission in the uplink LTE-NR shared carrier; or
physical resource blocks (PRBs) usable for uplink transmission in the uplink LTE-NR shared carrier are divided in frequency between PRBs usable for uplink NR transmission in the uplink LTE-NR shared carrier and PRBs usable for uplink LTE transmission in the uplink LTE-NR shared carrier.

23. The method of claim 21, wherein the configuration information indicates a signal quality threshold, wherein the NR UE is to perform random access to the NR system in the uplink NR carrier according to the first random access configuration when a signal quality on the downlink NR carrier is greater than or equal to the signal quality threshold and is to perform random access in the radio resources usable for uplink NR transmission in the uplink LTE-NR shared carrier according to the second random access configuration when a signal quality on the downlink NR carrier is less than the signal quality threshold.

24. The method of claim 21, wherein the configuration information indicates the NR UE is to perform random access in the radio resources usable for uplink NR transmission in the uplink LTE-NR shared carrier according to the second random access configuration when random access to the NR system in the uplink NR carrier according to the first random access configuration has failed a certain number of times.

25. A network node comprising:
one or more processors; and
one or more memories comprising computer program code, the one or more memories and the computer program code configured to, with the one or more processors, cause the network node to:
determine configuration information that indicates a first random access configuration in an uplink New Radio (NR) carrier and indicates a second random access configuration in an uplink Long Term Evolution (LTE)-NR shared carrier, wherein radio resources usable for uplink transmission in the uplink LTE-NR shared carrier are divided in time or frequency between radio resources usable for uplink NR transmission in the uplink LTE-NR shared carrier and radio resources usable for uplink LTE transmission in the uplink LTE-NR shared carrier, wherein the uplink LTE-NR shared carrier has a lower carrier frequency than the uplink NR carrier, wherein the configuration information configures an NR use equipment (UE) when to perform random access to the NR system in the uplink NR carrier according to the first random access configuration and when to perform random access to the NR system in the radio resources usable for uplink NR transmission in the uplink LTE-NR shared carrier according to the second random access configuration, and wherein the configuration information indicates the NR UE is to perform random access in the uplink LTE-NR shared carrier using a random access resource reserved for NR UEs performing random access in the uplink LTE-NR shared carrier as a fallback carrier after failure of random access to the NR system in the uplink NR carrier; and transmit the configuration information to the NR UE over a downlink NR carrier.

26. The network node of claim 25, the one or more memories and the computer program code configured to, with the one or more processors, cause the network node to monitor candidate random access resources in the uplink NR carrier and the uplink LTE-NR shared carrier to detect a random access in at least one of the uplink NR carrier and the uplink LTE-NR shared carrier.

* * * * *